US007664275B2

(12) United States Patent
Osmanovic et al.

(10) Patent No.: US 7,664,275 B2
(45) Date of Patent: Feb. 16, 2010

(54) ACOUSTIC FEEDBACK CANCELLATION SYSTEM

(75) Inventors: Nermin Osmanovic, Austin, TX (US); Victor Clarke, Coral Gables, FL (US)

(73) Assignee: Gables Engineering, Inc.

( * ) Notice: Subject to any disclaimer, the term of this patent is extended or adjusted under 35 U.S.C. 154(b) by 921 days.

(21) Appl. No.: 11/187,091

(22) Filed: Jul. 22, 2005

(65) Prior Publication Data

US 2007/0019824 A1 Jan. 25, 2007

(51) Int. Cl.
*H04B 15/00* (2006.01)

(52) U.S. Cl. ............................ 381/93; 381/83; 381/66; 381/96; 379/406.01; 379/406.05; 379/406.06; 379/406.12; 379/406.13; 379/406.14

(58) Field of Classification Search .................. 381/59, 381/83, 93, 96, 94.3, 73.1, 66; 379/406.01-406.06, 379/406.12-406.14
See application file for complete search history.

(56) References Cited

U.S. PATENT DOCUMENTS

| | | | | |
|---|---|---|---|---|
| 5,729,614 | A * | 3/1998 | Nagata et al. | 381/83 |
| 6,125,187 | A * | 9/2000 | Hanajima et al. | 381/83 |
| 7,574,005 | B2 * | 8/2009 | Tohyama et al. | 381/66 |
| 2005/0190930 | A1 * | 9/2005 | Desiderio | 381/103 |
| 2006/0159282 | A1 * | 7/2006 | Borsch | 381/93 |

* cited by examiner

*Primary Examiner*—Xu Mei
*Assistant Examiner*—Disler Paul
(74) *Attorney, Agent, or Firm*—Michael J. Buchenhorner

(57) ABSTRACT

A system for canceling acoustic feedback includes an input for receiving a digital audio signal and a processor configured to detect acoustic feedback signal in the digital audio signal and to determine the frequency of the feedback signal The system also includes a plurality of bandpass filters for attenuating the feedback signal. The processor is further configured to: select a bandpass filter from among the plurality of bandpass filters. The selected bandpass filter comprises a response characteristic that attenuates parts of the signal at the frequency of acoustic feedback signal.

14 Claims, 15 Drawing Sheets

| bin | frequency [Hz] | filter no. |
|---|---|---|
| 1 | 250 | - |
| 2 | 500 | 1 |
| 3 | 750 | 2 |
| 4 | 1000 | 3 |
| 5 | 1250 | 4 |
| 6 | 1500 | 5 |
| 7 | 1750 | 6 |
| 8 | 2000 | 7 |
| 9<br>10 | 2250<br>2500 | 8 |
| 11<br>12 | 2750<br>3000 | 9 |
| 13<br>14 | 3250<br>3500 | 10 |
| 15<br>16 | 3750<br>4000 | 11 |
| 17<br>18 | 4250<br>4500 | 12 |
| 19<br>20<br>21 | 4750<br>5000<br>5250 | 13 |
| 22<br>23<br>24 | 5500<br>5750<br>6000 | 14 |

FIG. 12

| | | frame | | | | | | | |
|---|---|---|---|---|---|---|---|---|---|
| [Hz] | [bin] | 1 | 2 | 3 | 4 | 5 | 6 | 7 | 8 |
| 250 | 1 | -85.70 | -92.31 | -94.69 | -82.12 | -84.49 | -95.55 | -103.84 | -82.30 |
| 500 | 2 | -82.99 | -87.35 | -103.15 | -93.74 | -78.02 | -79.44 | -78.62 | -78.67 |
| 750 | 3 | -84.92 | -96.98 | -90.41 | -85.83 | -80.39 | -84.33 | -70.17 | -75.96 |
| 1000 | 4 | -88.98 | -92.08 | -87.40 | -91.70 | -78.65 | -72.60 | -78.02 | -77.24 |
| 1250 | 5 | -85.12 | -84.39 | -82.46 | -94.33 | -76.21 | -78.02 | -77.07 | -76.71 |
| 1500 | 6 | -90.05 | -88.28 | -86.12 | -80.81 | -76.19 | -77.52 | -75.83 | -75.10 |
| 1750 | 7 | -86.34 | -86.49 | -89.82 | -84.42 | -89.64 | -74.65 | -71.82 | -71.39 |
| 2000 | 8 | -95.86 | -91.13 | -82.11 | -76.56 | -72.05 | -85.83 | -79.73 | -69.85 |
| 2250 | 9 | -87.87 | -90.46 | -92.42 | -87.40 | -74.74 | -81.23 | -88.46 | -66.76 |
| 2500 | 10 | -93.81 | -93.36 | -82.89 | -88.15 | -77.42 | -71.69 | -63.18 | -70.47 |
| 2750 | 11 | -78.14 | -84.09 | -87.99 | -87.26 | -73.88 | -72.38 | -67.18 | -71.26 |
| 3000 | 12 | -88.15 | -80.26 | -77.63 | -77.82 | -72.68 | -75.16 | -79.80 | -70.72 |
| 3250 | 13 | -75.53 | -79.26 | -80.10 | -78.65 | -70.75 | -73.94 | -67.79 | -68.22 |
| 3500 | 14 | -87.81 | -77.16 | -82.90 | -73.17 | -66.13 | -64.37 | -59.61 | -61.28 |
| 3750 | 15 | -53.77 | -52.09 | -50.29 | -47.85 | -45.92 | -43.71 | -41.01 | -38.25 |
| 4000 | 16 | -85.84 | -74.49 | -70.30 | -73.73 | -71.56 | -63.86 | -62.48 | -58.16 |
| 4250 | 17 | -74.68 | -79.82 | -92.58 | -79.80 | -73.81 | -66.82 | -64.34 | -70.16 |
| 4500 | 18 | -88.45 | -79.86 | -98.45 | -77.52 | -69.52 | -69.86 | -66.69 | -60.25 |
| 4750 | 19 | -79.59 | -78.31 | -79.62 | -74.54 | -77.15 | -72.95 | -76.45 | -70.36 |
| 5000 | 20 | -80.57 | -79.19 | -75.00 | -77.21 | -75.93 | -82.44 | -63.44 | -68.91 |
| 5250 | 21 | -86.39 | -85.80 | -87.95 | -70.75 | -78.54 | -82.67 | -72.89 | -78.65 |
| 5500 | 22 | -81.48 | -79.42 | -83.13 | -82.17 | -75.69 | -79.72 | -99.18 | -76.22 |
| 5750 | 23 | -78.22 | -80.24 | -80.43 | -79.17 | -79.17 | -76.16 | -74.82 | -71.95 |
| 6000 | 24 | -79.58 | -88.79 | -84.07 | -84.15 | -76.08 | -103.10 | -81.67 | -81.56 |
| 6250 | 25 | -89.32 | -91.62 | -88.78 | -95.10 | -82.24 | -95.94 | -80.80 | -73.91 |

| peak | step | one | two | three | four | five | six | seven | | |
|---|---|---|---|---|---|---|---|---|---|---|
| 0 | -29.598 | | | | | | | | | |
| 1 | -27.842 | 1.75584 | | | | | | | | |
| 2 | -26.128 | 1.73483 | 1.71383 | | | | | | | |
| 3 | -24.329 | 1.75617 | 1.75634 | 1.79885 | | | | | | |
| 4 | -22.544 | 1.76334 | 1.76585 | 1.79185 | 1.78486 | | | | | |
| 5 | -20.784 | 1.76263 | 1.76432 | 1.78115 | 1.77231 | 1.75976 | | | | |
| 6 | -18.955 | 1.77373 | 1.7773 | 1.79317 | 1.79128 | 1.79449 | 1.82923 | | | |
| 7 | -17.152 | 1.77789 | 1.78157 | 1.79511 | 1.79418 | 1.79729 | 1.81605 | 1.80288 | | |
| | *avg* | 1.76063 | 1.75987 | 1.79203 | 1.78566 | 1.78385 | 1.82264 | 1.80288 | | |
| | | | *0.00077* | *-0.0314* | *-0.025* | *-0.0232* | *-0.062* | *-0.0422* | *deviation* | *-0.03052* |

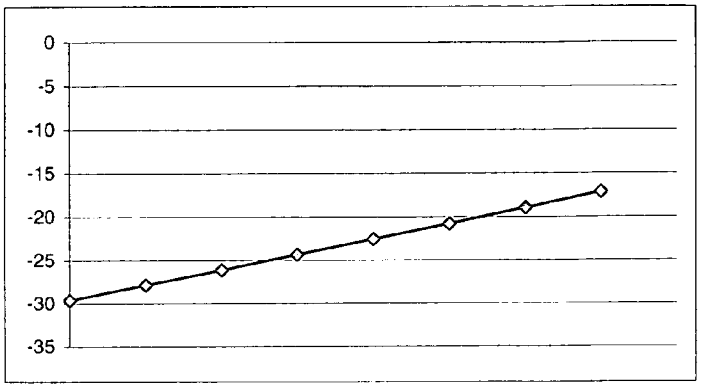
FIG. 18
| peak | *step* | one | two | three | four | five | six | seven | |
|---|---|---|---|---|---|---|---|---|---|
| **0** | **-50.573** | | | | | | | | |
| 1 | **-42.349** | **8.22435** | | | | | | | |
| 2 | **-18.992** | **15.7907** | 23.3571 | | | | | | |
| 3 | **-20.933** | **9.87984** | **10.7076** | **-1.9419** | | | | | |
| 4 | **-13.338** | **9.30884** | **9.67033** | **2.82695** | **7.59581** | | | | |
| 5 | **-11.169** | **7.88085** | **7.79497** | **2.6076** | **4.88236** | **2.1689** | | | |
| 6 | **-18.269** | **5.38393** | **4.81585** | **0.18053** | **0.88802** | **-2.4659** | **-7.1007** | | |
| 7 | **-17.089** | **4.78343** | **4.20994** | **0.38051** | **0.96111** | **-1.2505** | **-2.9601** | **1.1804** | |
| | *avg* | 8.75028 | 10.0926 | 0.81073 | 3.58182 | -0.5158 | -5.0304 | 1.1804 | |
| | | | *-1.3423* | *7.93954* | *5.16846* | *9.26609* | *13.7807* | *7.56988deviation* | [illegible] |
FIG. 19
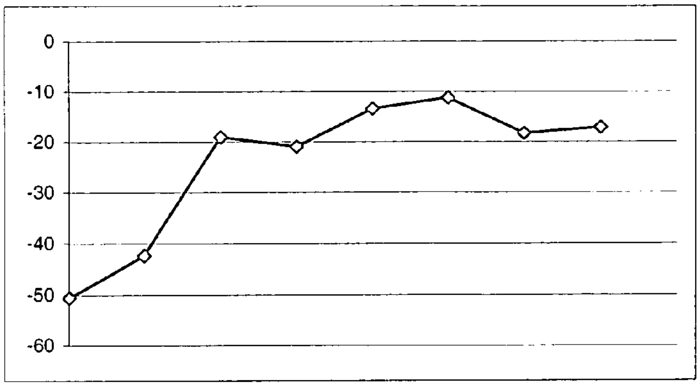
FIG. 20

| | 1 | 2 | 3 | 4 | 5 | 6 | 7 | 8 |
|---|---|---|---|---|---|---|---|---|
| 1 | -85.70 | -92.31 | -94.69 | -82.12 | -84.49 | -95.55 | -103.84 | -82.30 |
| 2 | -82.99 | -87.35 | -103.15 | -93.74 | -78.02 | -79.44 | -78.62 | -78.67 |
| 3 | -84.92 | -96.98 | -90.41 | -85.83 | -80.39 | -84.33 | -70.17 | -75.96 |
| 4 | -88.98 | -92.08 | -87.40 | -91.70 | -78.65 | -72.60 | -78.02 | -77.24 |
| 5 | -85.12 | -84.39 | -82.46 | -94.33 | -76.21 | -78.02 | -77.07 | -76.71 |
| 6 | -90.05 | -88.28 | -86.12 | -80.81 | -76.19 | -77.52 | -75.83 | -75.10 |
| 7 | -86.34 | -86.49 | -89.82 | -84.42 | -89.64 | -74.65 | -71.82 | -71.39 |
| 8 | -95.86 | -91.13 | -82.11 | -76.56 | -72.05 | -85.83 | -70.73 | -69.85 |
| 9 | -87.87 | -90.46 | -92.42 | -87.40 | -74.74 | -81.[illegible] | [illegible] | -66.76 |
| 10 | -93.81 | -93.36 | -82.89 | -88.15 | -77.42 | -71.[illegible] | [illegible] | -70.47 |
| 11 | -78.14 | -84.09 | -87.99 | -87.26 | -73.88 | -72.[illegible] | [illegible] | -71.26 |
| 12 | -88.15 | -80.26 | -77.63 | -77.82 | -72.68 | -75.16 | -79.80 | -70.72 |
| 13 | -75.53 | -79.26 | -80.10 | -78.65 | -70.75 | -73.94 | -67.79 | -68.22 |
| 14 | -87.81 | -77.16 | -82.90 | -73.17 | -66.13 | -64.37 | -59.61 | -61.28 |
| 15 | -53.77 | -52.09 | -50.29 | -47.85 | -45.92 | -43.71 | -41.01 | -38.25 |
| 16 | -85.84 | -74.49 | -70.30 | -73.73 | -71.56 | -63.86 | -62.48 | -58.16 |
| 17 | -74.68 | -79.82 | -92.58 | -79.80 | -73.81 | -66.82 | -64.34 | -70.16 |
| 18 | -88.45 | -79.86 | -98.45 | -77.52 | -69.52 | -69.86 | -66.69 | -60.25 |
| 19 | -79.59 | -78.31 | -79.62 | -74.54 | -77.15 | -7[illegible] | [illegible] | -70.36 |
| 20 | -80.57 | -79.19 | -75.00 | -77.21 | -75.93 | -8[illegible] | [illegible] | -68.91 |
| 21 | -86.39 | -85.80 | -87.95 | -70.75 | -78.54 | -8[illegible] | [illegible] | -78.65 |
| 22 | -81.48 | -79.42 | -83.13 | -82.17 | -75.69 | -79.72 | -99.18 | -76.22 |
| 23 | -78.22 | -80.24 | -80.43 | -79.17 | -79.17 | -76.16 | -74.82 | -71.95 |
| 24 | -79.58 | -88.79 | -84.07 | -84.15 | -76.08 | -103.10 | -81.67 | -81.56 |
| 25 | -89.32 | -91.62 | -88.78 | -95.10 | -82.24 | -95.94 | -80.80 | -73.91 |
| 26 | -95.19 | -95.23 | -91.23 | -102.28 | -83.68 | -93.37 | -81.79 | -75.48 |
| 27 | 0.00 | -97.78 | -92.80 | -104.03 | -84.68 | -92.83 | -82.50 | -76.28 |

Average attenuation left (column 5, rows 8–13)

Average attenuation right (column 5, rows 17–22)

FIG. 21

| | | | |
|---|---|---|---|
| 1 | START | 1 | INITALIZE LOCAL VARIABLES |
| | | 2 | ADJUST HOST FEEDBACK COUNTER |
| | | 3 | SELECT PING-PONG PROCESSING BUFFER |
| 2 | INITIALIZE HOST VARIABLES | 1 | ADJUST FILTER VOLUME LEVELS |
| | | 2 | UPDATE ADJACENT FILTER LEVELS |
| | | 3 | UPDATE OVERLOAD ATTENUATION |
| 3 | RESET TEMPORARY VARIABLES | 1 | NOISE FLOOR |
| | | 2 | FEEDBACK DETECTOR |
| 4 | INPUT AUDIO DATA | 1 | STORE INPUT GAIN ARRAY |
| | | 2 | RELEASE PING-PONG PROCESSING BUFFER |
| 5 | DC OFFSET REMOVAL | 1 | CALCULATE NOISE FLOOR AVERAGE |
| | | 2 | SUBTRACT AVERAGE FROM INPUT SIGNAL |
| 6 | DECIBEL SCALE CONVERSION | 1 | CALCULATE DECIBEL SAMPLE VALUES |
| | | 2 | APPLY TO INPUT SIGNAL |
| 7 | NOISE FLOOR ESTIMATION | 1 | CALCULATE NOISE FLOOR IN DECIBELS |
| | | 2 | CALCULATE SLOW FOLLOWING NOISE LEVEL |
| | | 3 | CALCULATE FAST FOLLOWING NOISE LEVEL |
| 8 | FAST FOURIER TRANSFORM | 1 | STORE INPUT SIGNAL TO FFT ARRAY |
| | | 2 | PERFORM FFT OPERATION |
| | | 3 | STORE MAGNITUDE RESPONSE |
| | | 4 | CONVERT RESPONSE TO DECIBEL SCALE |
| 9 | HISTORY BUFFER INSERTION | 1 | STORE FFT RESPONSE USING FIFO METHOD |
| 10 | OVERLOAD PROTECTION | 1 | INCREMENT OVERLOAD COUNTER |
| | | 2 | PERFORM OVERLOAD SWITCHING DECISION |
| | | 3 | SELECT OVERLOAD OPERATION STATE |
| 11 | FEEDBACK DETECTION | 1 | CALCULATE FEEDBACK DETECTION THRESHOLD |
| 12 | MAXIMUM PEAK DETECTION | 1 | FIND GLOBAL MAXIMUM PEAK IN HISTORY ARRAY |
| 13 | SLOPENESS CALCULATION | 1 | PERFORM SLOPE ANALYSIS TO FIND DEVIANCE |
| | | 2 | FIND GLOBAL SLOPE AVERAGE |
| | | 3 | CALCULATE NORMALIZED DEVIANCE |
| | | 4 | DETERMINE SLOPENESS DECIMAL VALUE |
| 14 | PEAKNESS CALCULATION | 1 | ADJUST SEARCH BOUNDARIES |
| | | 2 | CALCULATE LEFT AND RIGHT ATTENUATION |
| | | 3 | DETERMINE PEAKNESS NUMBER VALUE |
| 15 | FEP CALCULATION | 1 | ADJUST FEATURE RELEVANCE USING WEIGHTS |
| | | 2 | DETERMINE FEEDBACK EXISTANCE PROBABILITY |
| 16 | FEEDBACK FILTERING | 1 | DETERMINE FILTER FREQUENCY |
| | | 2 | ATTENUATE APPROPRIATE FILTERS |
| 17 | END | 1 | RESET FILTER VOLUME COUNTERS |

FIG. 22

ACOUSTIC FEEDBACK CANCELLATION SYSTEM

FIELD OF THE INVENTION

The invention disclosed broadly relates to the field of electronic systems, and more particularly relates to the field of acoustic feedback cancellation systems.

BACKGROUND OF THE INVENTION

Acoustic feedback oscillations occur at the frequencies of the maximum peak amplitude room response, if the gain and phase conditions are satisfied. Acoustic feedback occurs in wide variety of situations involving microphone, power-amp, and speakers. FIG. 1 shows a typical audio system 100 where acoustic feedback may occur. A microphone 102 receives audio signals such as voice. Components 104-108 process and amplify the received signal for presentation by a speaker 110. The feedback problem begins when the microphone 102 receives the speaker signal that includes an amplified version of the original audio signal received at the microphone 102. That feedback signal is amplified again by the system 100. This process continues until the amplifiers 104 and/or 108 are driven into a saturation state and the sound provided by the speaker becomes unintelligible.

In a real-time sound system, a loud feedback tone appears quickly, without any warning. The acoustic feedback phenomenon is dependent on several conditions: physical position of microphones/headphones/speakers; current overall gain level; acoustical response of the environment; resonant frequency of each transducer in the system.

In general, the problem of headroom improvement versus audio quality is common for all feedback cancellation equipment. Usually, peak amplitude response analysis of all sound elements is sufficient to partially characterize the self-oscillation properties of the feedback-prone audio system.

Feedback in an Aircraft Audio System

One example of a situation where acoustic feedback can occur with substantial adverse consequences is an aircraft cockpit. In the case of an aircraft cockpit sound system with multiple audio paths, there exists a large variation of possible feedback situations that can occur at any time. If the overall gain of the system is high, even a small movement of the microphone can cause a loud unwanted sound amplified by the current resonant oscillation. The situation is even more complicated because of the number of transducers used in the aircraft cockpit during flight. For example, each pilot has separated headphone/microphone headset (three transducers each). Additional hand-held microphones are available in the aircraft as well. Also, two co-axial speakers are located in the cockpit.

Previous implementations of an acoustic feedback cancellation in an aircraft cockpit have resulted in two major problems. The first problem was the large frequency width of the notch filters used for feedback suppression. Activated filters would remove large chunks of the signals' energy across the frequency bands, which causes significant deterioration in the intelligibility of the speech. In extreme cases, the quality of the signal is affected so much that pilots have decided to turn the feedback cancellation mechanism off completely.

The second problem is the feedback detection algorithm used. When a monotone voice is used as an input to the detector, speech is falsely classified as feedback, and filters activate and notch out portions of the signal. This problem shows the necessity of a enhanced feedback detection mechanism that uses more than one feedback feature to make a decision. Therefore, there is a need for a feedback cancellation system that overcomes the foregoing and other problems with known solutions.

SUMMARY OF THE INVENTION

Briefly, according to an embodiment of the invention, a system for canceling acoustic feedback includes an input for receiving a digital audio signal and a processor configured to detect a feedback signal in the digital audio signal and to determine the frequency of the feedback signal. The system also includes a plurality of bandpass filters for attenuating the feedback signal. The processor controls the bandpass filter subsystem by selecting a bandpass filter from among the plurality of bandpass filters. The selected bandpass filter comprises a response characteristic that attenuates parts of the signal at the frequency of the feedback signal.

BRIEF DESCRIPTION OF THE DRAWINGS

FIG. 12 shows a set of bandpass filter frequency separations.

FIG. 18 shows the gain rise of acoustic feedback.

FIG. 19 shows the calculation of deviance for Peaks array for a non-feedback signal.

FIG. 20 shows a high variation of the frequency bin gain slope in non-feedback signal.

FIG. 21 shows the content of an audio history buffer used to find peakness of the signal.

FIG. 22 shows the operating sequence of a system and method according to the embodiment.

DETAILED DESCRIPTION

Acoustic Feedback Analysis

The first step in solving the acoustic feedback problems discussed above is to understand the nature of acoustic feedback at an early point of its generation such that it can be suppressed or cancelled before it can be heard by humans.

Waveform Linear Display

Figure 2:
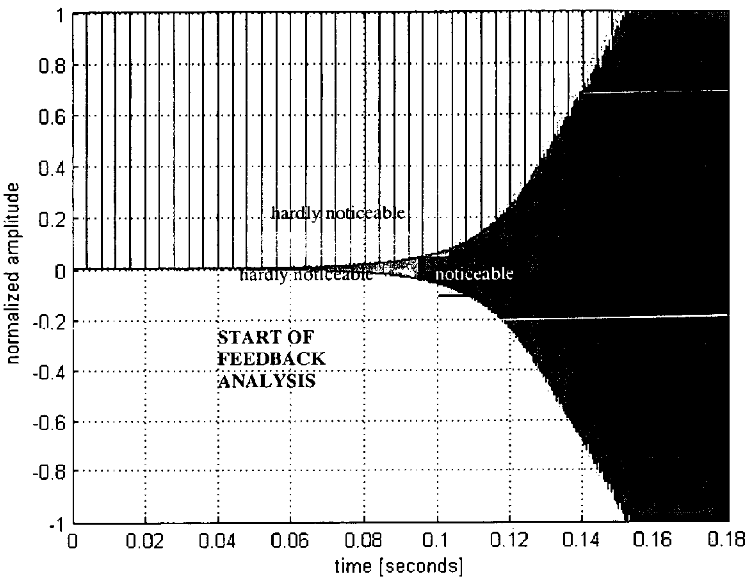
FIG. 2 is the time response of a feedback signal on a linear scale.

The waveform of the feedback is plotted using a normalized amplitude linear scale for the y axis. FIG. 2 shows an audio waveform of recorded feedback, created using a pilots' headset. The response shown in FIG. 2 is based on the environment conditions of an audio control panel (ACP). The conditions include sampling frequency, frame buffer size, and frequency transform.

In this embodiment, the received waveform is segmented into 128-sample frames. A good starting point of analysis is the beginning time of the feedback appearance. The zone of a hardly noticeable feedback tone extends for about 14 frames. This is the time region during which feedback detection and removal should operate. If the feedback frequency is attenuated before it reaches the noticeable zone, the sound produced by feedback is so quiet that it is not heard at all.

Waveform Logarithmic Display

A further analysis of the feedback tone comprises taking the absolute value of each sample in a waveform, and displaying it using a logarithmic (dB) scale on the y axis. This type of analysis demonstrates better performance at selecting the correct feedback zone limits, as shown in FIG. 3.

Figure 3:
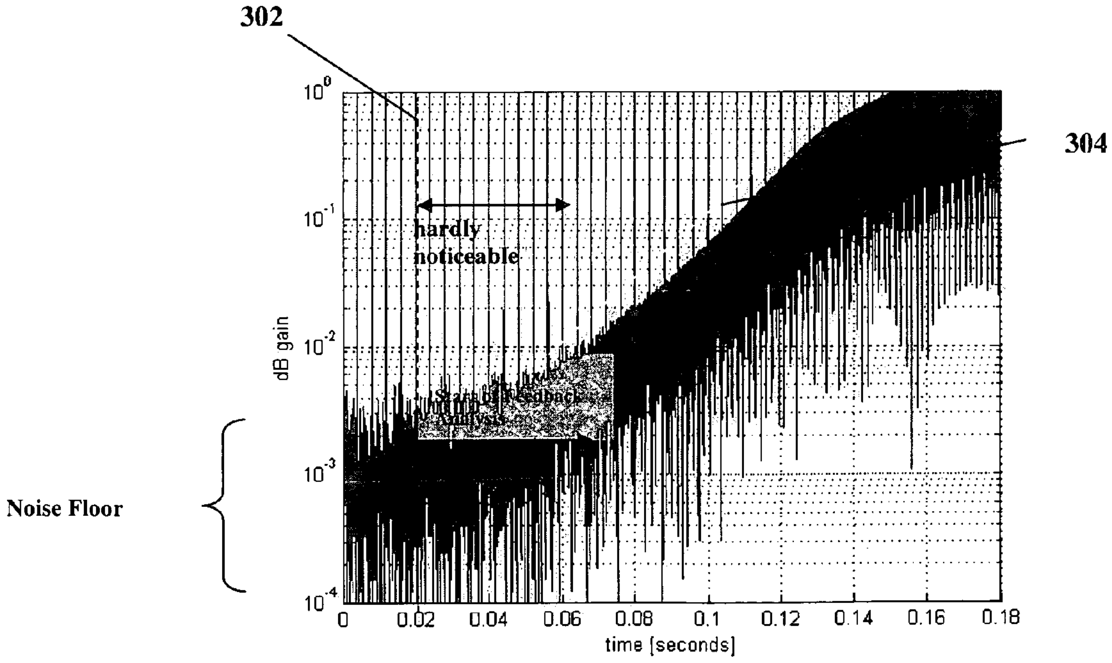
FIG. 3 is the time response of a feedback signal on a logarithmic scale.

In FIG. 3, the starting point of the feedback event is marked using dashed vertical line 302, as well as the time point until when the feedback is barely noticeable. The region to the right of the line 302 marks the time when humans start perceiving, or hearing, the feedback tone. The feedback detection zone can be determined using these time points. This is important because feedback can be removed even before it is heard. The absolute value logarithmic display enables stretching out zone limits in both directions (x and y), which is very important for correct feedback detection and removal.

Based on these findings, a feedback cancellation algorithm (FCA) algorithm converts all audio input to a dB scale to perform, sensitive, quick, and efficient feedback detection. Then, the real time control of the band-pass filters is used to suppress feedback frequency gradually. In conclusion, if the feedback amplitude gain is detected within 10 dB change from the noise floor, feedback is not heard yet, and it can be removed using equalization filtering.

A prominent characteristic exhibited in all feedback occurrences is an exponential rise of the spectral band energy, that is, a linear (straight) slope in the decibel logarithmic scale. This rise characteristic can be influenced by the overall gain of the system, position of the audio equipment, and response of the transducers. An example of a typical feedback waveform with rough estimation of the rise slope is shown as a line 304 in FIG. 3.

Two main feedback types are determined: "good" ("conforming") feedback; and bad" ("nonconforming") feedback. The first category feedback occurs under normal operating conditions, and it is the expected behavior of any feedback event. The feedback frequency rises sharply (exponentially), and this frequency is supportive of the dominant resonant mode of the system. The first feedback category is easy to detect and control using equalizing bandpass filters.

The second category of feedback ("nonconforming feedback") occurs when the resonant modes are on the verge of dominance. In this case, the response of the system can become unexpected. This happens because of several factors, including high overall gain, close proximity between the transducers (almost touching), or poor acoustical response of the enclosure. The nonconforming feedback has a tendency to introduce new elements in the signal that are unknown to the feedback detector mechanism, such as additional arbitrary energy bursts, varying exponential rise, multiple spectral peaks, and others. Even though it occurs rarely, second category feedback can bring the system into unstable state and produce loud feedback tone. To prevent this occurrence from happening in the cockpit, the feedback cancellation algorithm (FCA) buffer is monitored continuously by the overload gain protection (OGP) algorithm, which effectively decreases the gain incrementally to destroy the feedback.

In normal operating conditions, one dominant feedback frequency takes over the complete system and puts it into saturation mode. However, when the dominant feedback frequency is suppressed in real-time using digital filters, additional resonant modes appear at different frequencies simultaneously. This phenomenon introduces additional difficulties in the design of robust mechanism for acoustic feedback removal.

System Overview

Figure 1:
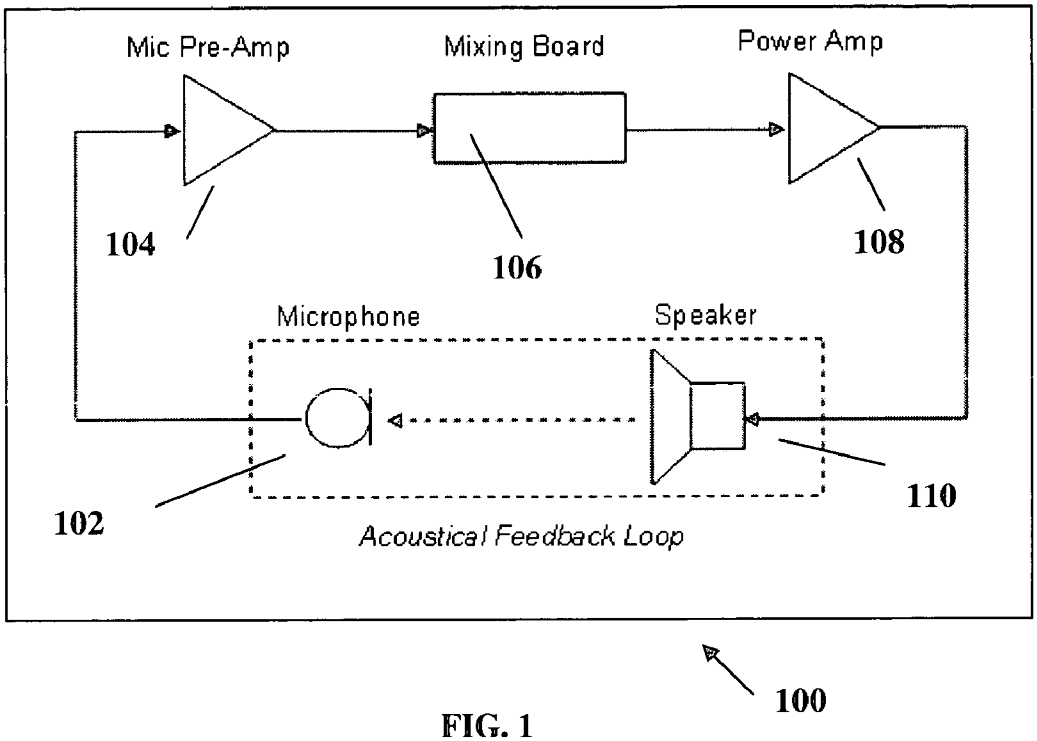
FIG. 1 is a schematic of an electronic circuit wherein an acoustic feedback problem can exist.
Figure 4:
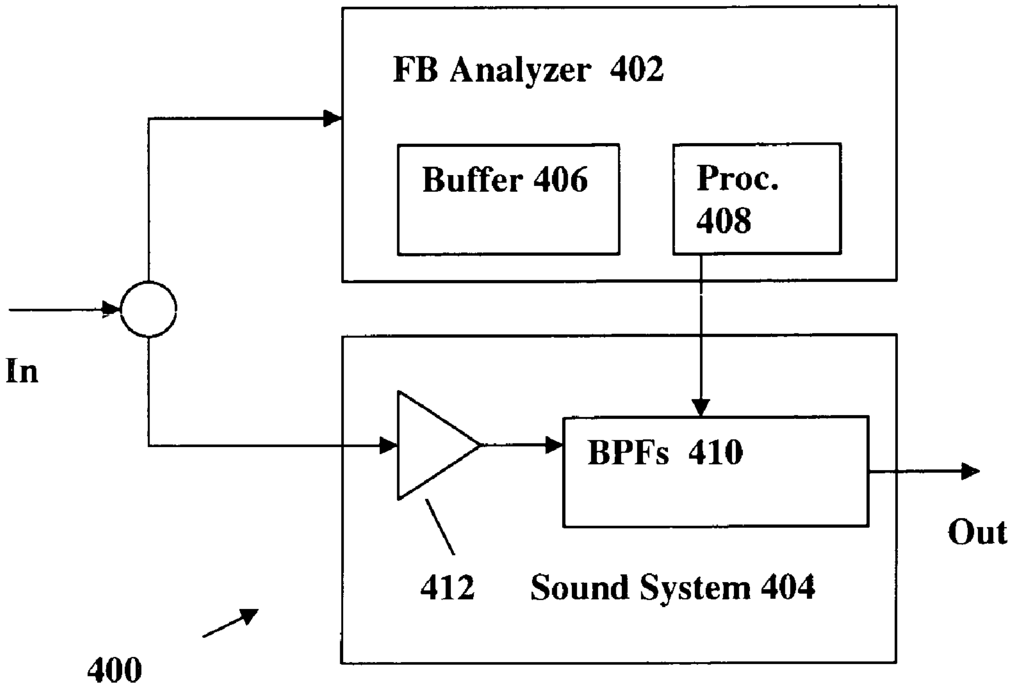
FIG. 4 is a simplified block diagram of a feedback cancellation system according an embodiment of the invention.

Referring to FIG. 4, we show a conceptual block diagram of an acoustic feedback cancellation system 400 according to an embodiment of the invention. The system 400 includes a feedback analyzer 402 that receives audio signals from a microphone such as depicted in FIG. 1 and an electronic sound system 404. The acoustic feedback analyzer 402 processes the input audio signal to detect an acoustic feedback signal and its frequency. A buffer 406 stores samples of the input signal for analysis by a processor (e.g. a standard microprocessor or digital signal processor). The acoustic feedback analyzer 402 can be implement with any suitable microprocessor-driven computer system.

The electronic system 404 includes amplification 412 and other signal processing circuitry typical of sound systems (such as those used in aircraft cockpits) and a bandpass filter subsystem 410 that attenuates the acoustic feedback signal under the control of the feedback analyzer 402 as discussed herein.

Figure 5:
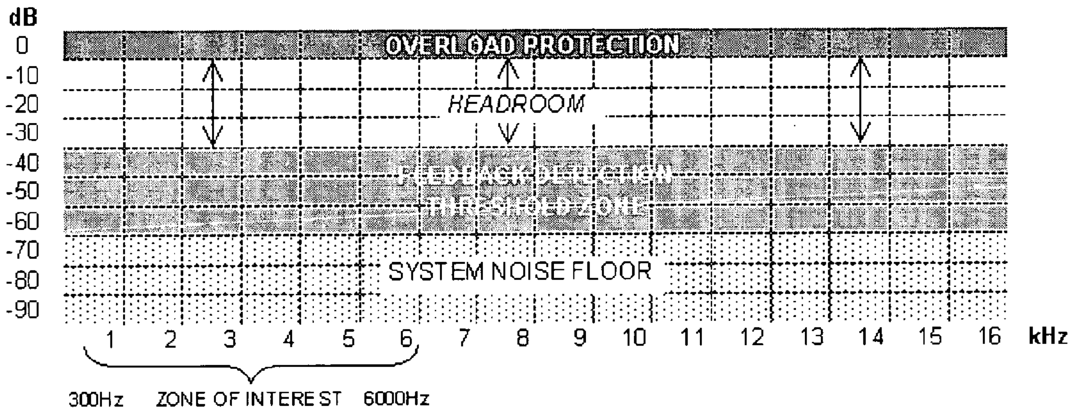
FIG. 5 shows digital system characteristics for an audio system according to an embodiment of the invention.

The feedback tone can occur across the complete frequency range supported by the system. FIG. 5 shows dynamic range (vertical axis) and frequency range (horizontal axis) of the ACP digital audio system (32000 sample rate, 12 bits resolution) as used by the FCA function.

System stability under high gain operating conditions, and feedback detector robustness, are the crucial elements for successful feedback cancellation operation. The audio system prone to feedback oscillations should be kept on the verge of resonance to obtain maximum gain overhead increase.

Digital Audio Buffer

Figure 6:
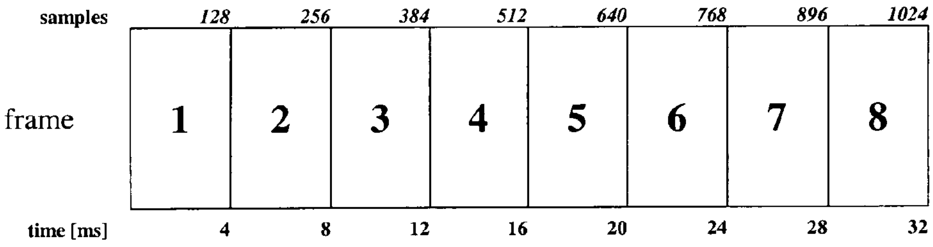
FIG. 6 shows a set of frame delimiters used for the audio buffer according to this embodiment of the invention.

The ACP audio system 400 provides feedback cancellation with real-time buffer frame size of 128 samples, which is 4 ms at 32000 sample rate. FIG. 6 shows buffer frames and their corresponding positions (in samples) and times (in milliseconds).

Filters

According to this embodiment a bank of bandpass filters 410 is used to attenuate the part of the input signal including the acoustic feedback. This method is used to minimize number of sections used in real-time, and to maintain frequency response within 3 dB of the response ripple envelope. The magnitude response of the first bandpass filter is in the 300 Hz-600 Hz range. All filters are in Direct Form-II, have four sections (order 8), and poles are located within unit circle (condition for stability).

Figure 7:
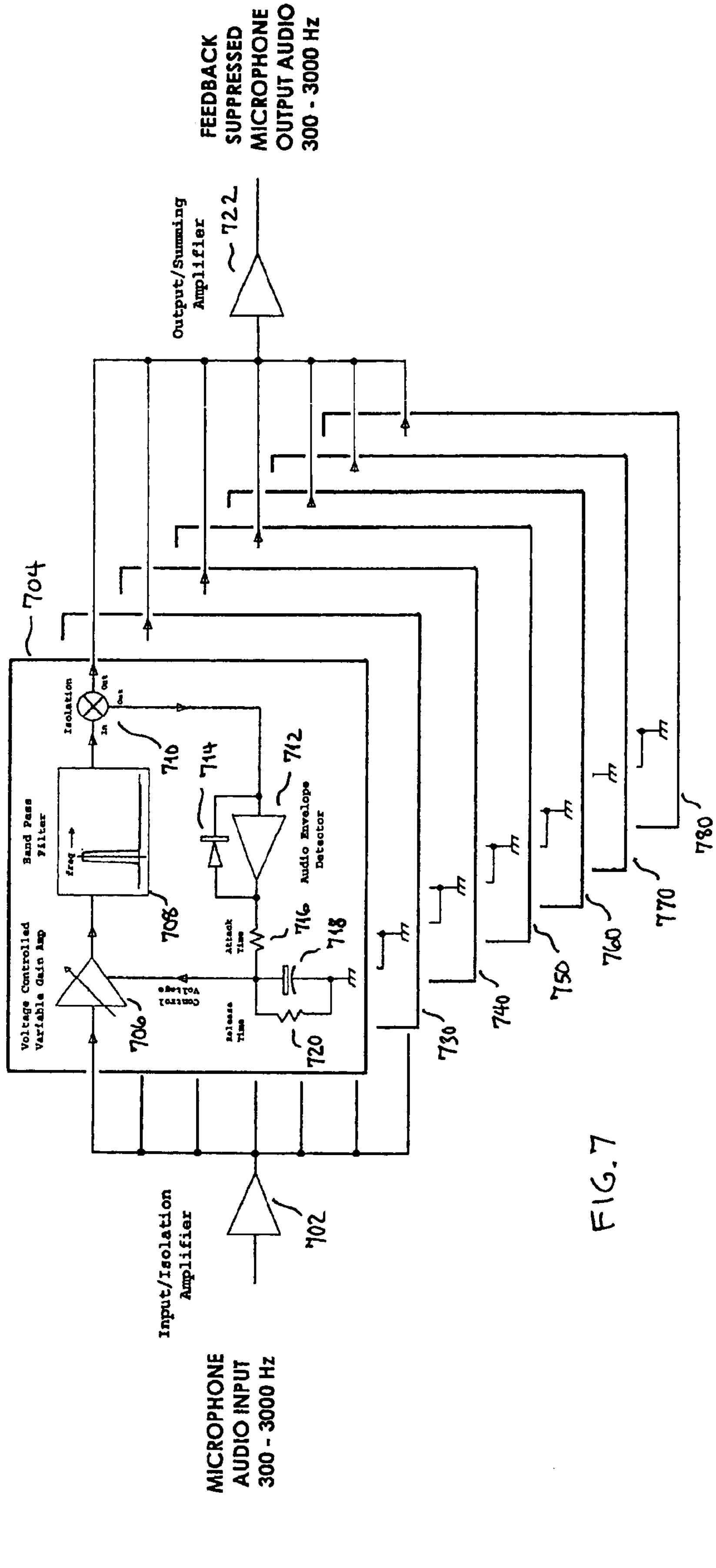
FIG. 7 is a schematic of an analog representation of a bandpass filter according to this embodiment of the invention.

FIG. 7 is a schematic of an analog representation of a bandpass filter (BPF) according to another embodiment of the invention. The microphone audio input (300-6,000 Hz) is received at an input amplifier 702. The output of the amplifier 702 is provided to a plurality of filters 704, 730, 740, 750, 760, 770, and 780 (representing a bank of selectable bandpass filters). In the preferred embodiment fourteen such filters are used coupled in parallel. The output of these filters is combined and provided to an output/summing amplifier 722. We now discuss the structure and operation of BPF 704, as representative of each of the bank of BPFs.

The output of amplifier 702 is received at a voltage-controlled variable gain amplifier 706 which provides its output to a BPF 708. An isolator 710 provides the filtered output signal to amplifier 722 and to an audio envelope detector 712 (having a feedback loop 714). The attack time and release time are determined by appropriate selection of values for a series resistor 716 and a resistor 720 coupled to ground in parallel with a capacitor 718. A control voltage is provided to the amplifier 706 as shown in FIG. 7 so as to, when appropriate, decrease the gain of its channel. All channel signal sources are common. Each output channel separately drives its own envelope detector.

A continuing energy buildup at any single frequency (i.e. acoustic feedback) causes a reduction in the gain of the bandpass channel corresponding to that frequency. Appropriate attach and release time constants in ach channel AGC separates "speech" from acoustic feedback because of the time distribution impulse character of speech syllables versus the continuous nature of acoustic feedback.

Figure 8:
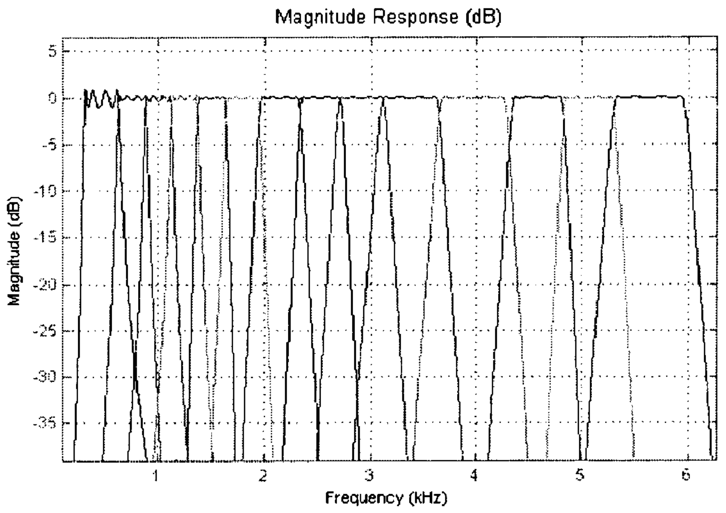
FIG. 8 shows the magnitude response of all fourteen filters used by the embodiment of the feedback cancellation system.

The bandpass filters 410 are designed in a manner that follows the logarithmic frequency separation of the human hearing system (Bark scale). The exact frequency values are modified slightly to comply with the system 400 band limited audio signal. The magnitude response of each filter is shown in FIG. 8. When no feedback signal is detected the filters 410 operate as an "all-pass" filter.

The microphone audio signal frequency spectrum is divided into seven (more or less) constant percentage bandpass channels distributed between 300 Hz and 6 KHz.

Magnitude response performance of each adjacent filter in transition bands is critical for maintaining a flat frequency response. This requirement is tested in Simulink by importing coefficients of individual bandpass filters from Matlab, using the sweeping sinusoidal waveform on their input, and then summing their response on the spectrum scope.

Bandpass Frequency Specification

Figure 9:
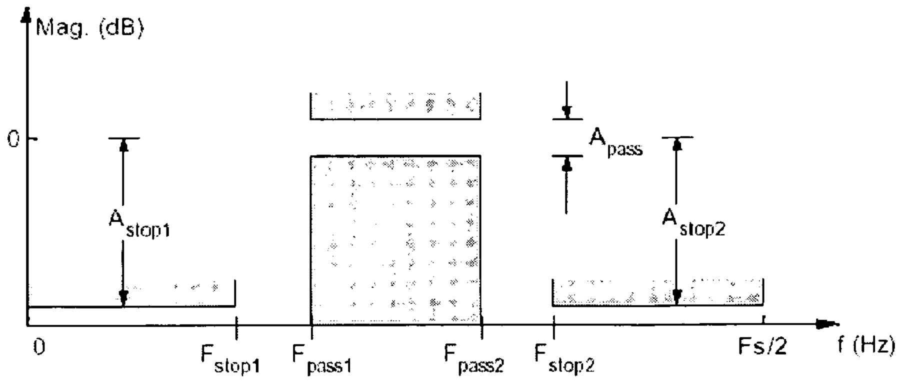
FIG. 9 shows a bandpass design parameter specification.

The filters used by the system 400 are designed to coarsely follow critical band frequency separation of the human hearing system. Digital filter design requires certain parameters to be known a priori. The parameters used by the system 400 are estimated using prior knowledge and a trial and error method. Detailed diagram of main parameters is shown in FIG. 9.

Figure 10:
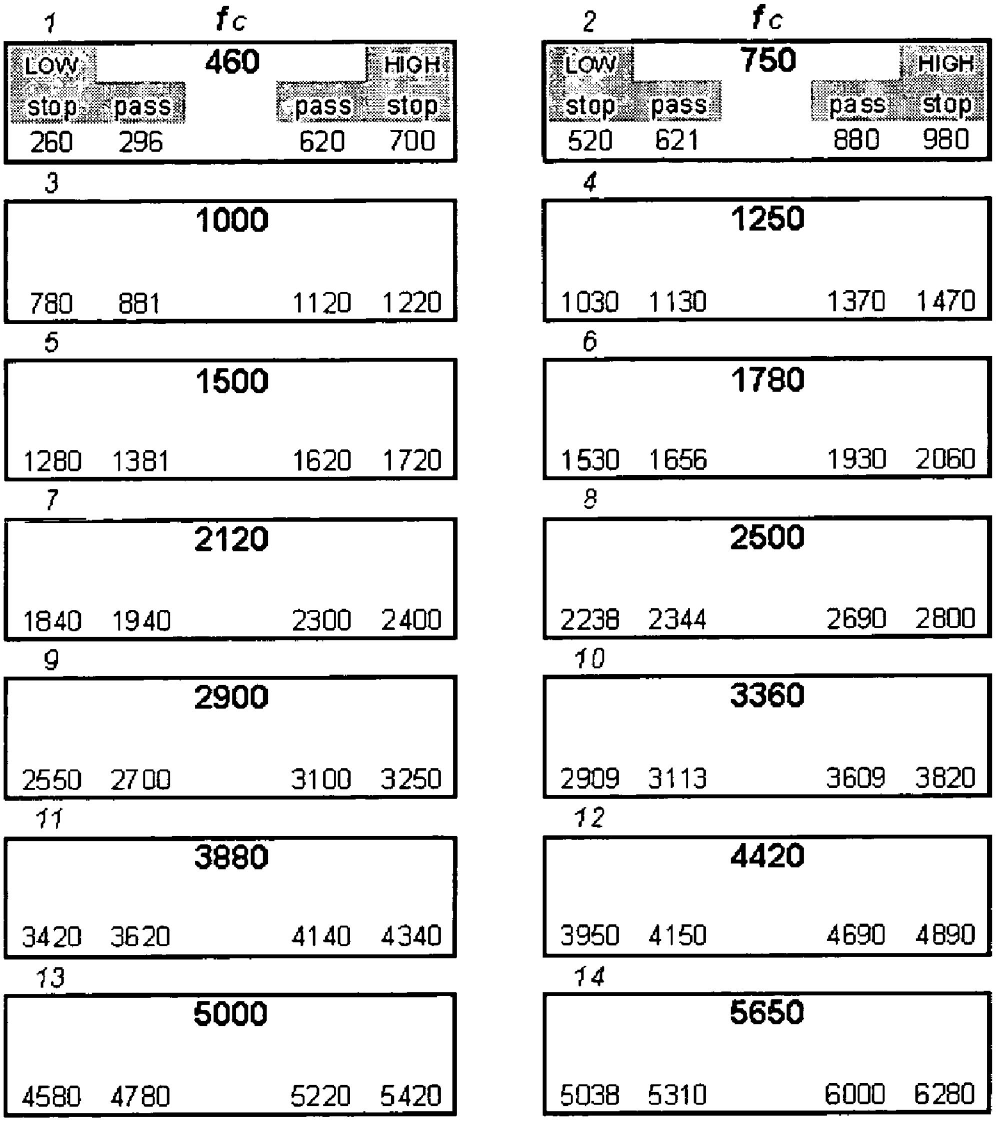
FIG. 10 shows numerical frequency values for fourteen filters.

The exact values of the filter design parameters are used to create new filters. FIG. 10 shows center frequencies of fourteen filters (in Hz), and their approximate stop/pass frequencies for low and high ends. The exact values of the filter design parameters are used to create new filters. FIG. 10 shows center frequencies of fourteen filters (in Hz), and their approximate stop/pass frequencies for low and high ends.

Implementation of an Embodiment

The FCA can be implemented using C programming language, as a functional software module of the ACP's digital audio system. The microphone audio signal frequency spectrum is divided into fourteen band-pass channels distributed between 300 and 6000 Hz. Each channel resides normally at near maximum gain, i.e. audio stream is unaffected. All channels are driven by the global spectral envelope analyzer, which controls filter selection and attenuation in real-time. Each output channel is summed with all the other channels to provide a composite microphone output, with flat frequency response.

A continuing energy buildup at any single frequency (i.e. acoustic feedback), causes a reduction in gain of the bandpass channel corresponding to that frequency. Appropriate attack and release time constants control how the filters attenuate in time. That is, speed of kick-in (from max to min), and kick-out (from min to max) operations.

Real Time Operation

The fourteen bandpass filters are set-up in ACP software as band-pass digital filters residing near maximum gain, which operate continuously on the input audio buffer to provide complete frequency range response. Each filter channel has separate control of the magnitude gain (operating in real-time), which allows great flexibility during frequency equalization. The speeds at which filters engage and disengage are defined using filter time constants.

Figure 11:
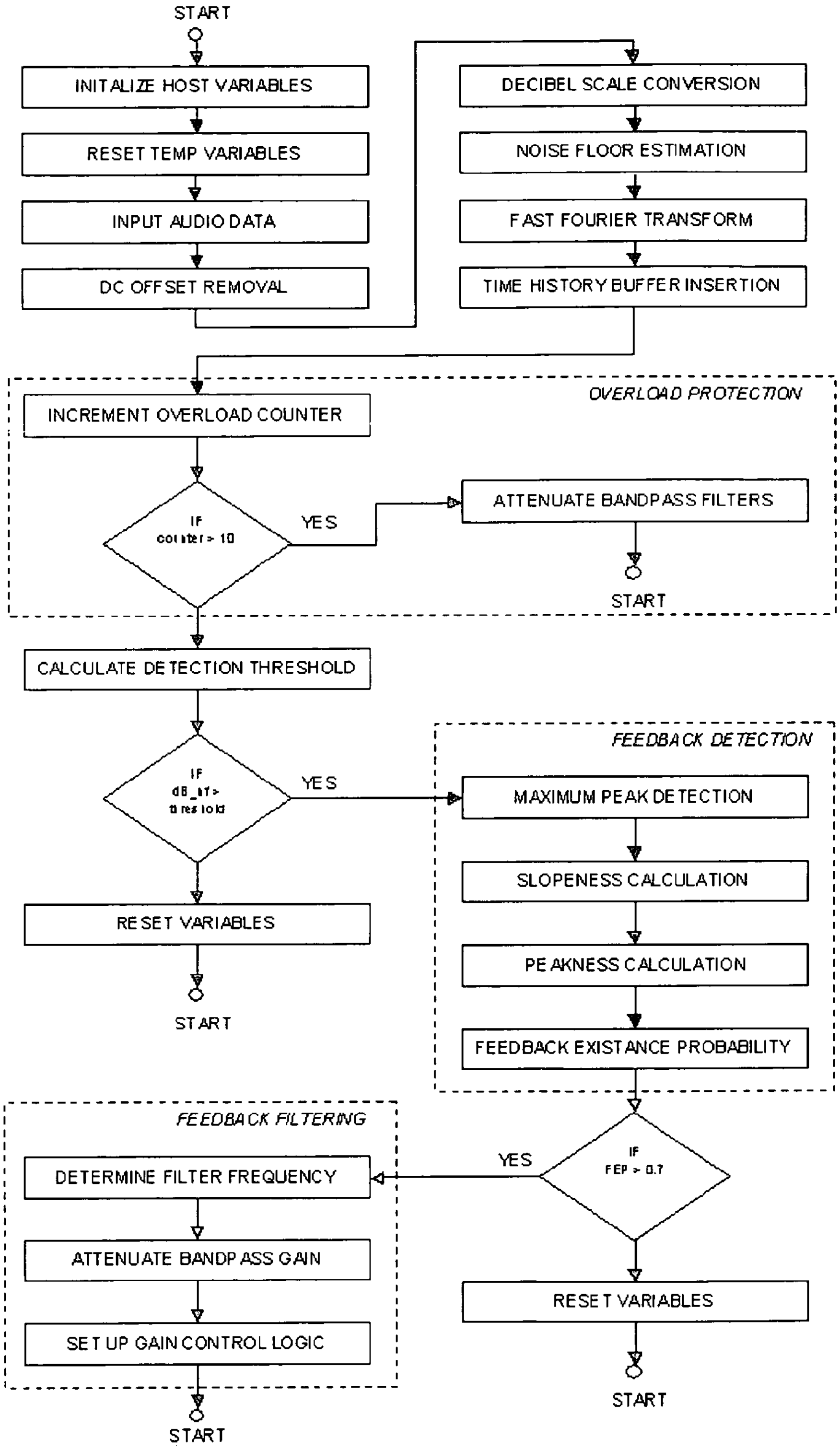
FIG. 11 shows a dataflow chart for a feedback cancellation system according to an embodiment.

Referring to FIG. 11, a flowchart shows the dataflow in a method 1100 according to another embodiment. The method starts at a step 1102 wherein the input signal is prepared for analysis to detect an acoustic feedback signal. Step 1102 comprises one or more of initializing the host variables, resetting temperature variables, receiving input audio data, DC offset removal, decibel scale conversion, noise floor estimation, performing an FFT, and inserting a time history buffer.

In step 1104 an overload gain protection is provided. This step comprises incrementing an overload counter; determining whether the counter value is greater than a threshold (such as ten); if it is, attenuating the BPFs and returning to the start of the method.

If the counter value is not greater than the threshold, the method continues to a step 1106 wherein a detection threshold is calculated. Then in step 2108 a determination is made as to whether the decibel level of an audio input signal sample being analyzed is greater than the calculated threshold. If the threshold is not exceeded, in step 1110 the variables are reset and the method returns to start. If the threshold is exceeded, a feedback detection step 1112 is performed. The feedback detection step 1112 comprises one or more of detecting the maximum peak of the input audio signal; calculating the slopeness of the input audio signal; performing a peakness calculation; and detecting the feedback existence probability (FEP). In step 1114 a determination is made as to whether the FEP is greater than a threshold (e.g., 0.7). If it is not, the variables are reset and the method returns to start.

If the FEP is greater than the threshold, in step 1118 the feedback signal is filtered. Filtering the feedback signal comprises one or more of determining the filter frequency; attenuating the bandpass gain and setting up the gain control logic. The method then returns to start.

A routine performs feedback cancellation on the live audio stream using several operations. After power-up, the process is split into four separate operations of 1 millisecond each.

The initial FCA setup is performed on the power-up, and includes initialization of local variables used by the system, and adjustment of the host counter variable used for optimization. Also, the current available audio buffer (PING or PONG) is selected using the buffer select variable.

At this stage, all necessary variables are adjusted according to the set of predetermined rules. The amount of attenuation is dependant on the speaker knob position, controlled by the feedback filter level variable. Filters that are adjacent to the activated feedback frequency are kept at 12 dB above feedback filter level. Next, the overload level attenuation is initialized to 8 dB below the noise ceiling of the system.

Reset Temporary Variables

1st Millisecond

To fulfill memory, speed, and reliability requirements, all temporary variables used in the FCA are properly reset at this stage. This includes variables that are used in calculation of noise floor, Peakness, Slopeness, filter frequency, feedback existence probability (FEP), and slopes deviation.

Input Audio Data

1st Millisecond

The real-time audio is received using array buffers, controlled via a ping-pong switching mechanism. The input array is filled with audio samples using a for loop, and then the processed buffer array is released for the next audio input data.

Direct Current Offset Removal

1st Millisecond

The standard preparation of unknown audio input includes DC-offset removal, used for algorithm robustness. This operation prevents any change to the FCA performance dependant on the changing input direct current offset. To perform DC removal operation, noise floor is calculated over 128 samples window, its average found, and finally this average value is subtracted from each sample in the audio buffer array.

Decibel Scale Conversion

2nd Millisecond

For better sensitivity of the FCA function, each sample of the audio input is converted to a decibel (logarithmic) scale. Mathematical conversion to the decibel scale can be performed using the following formula:

$$dB = 20 * \log_{10}\left|\frac{x(t)}{ref}\right|$$

where x(t) is the input signal sequence, and ref is the reference sound pressure, which in this case equals to 1 (floating point representation).

Noise Floor Estimation

3rd Millisecond

A large variability of situations can happen during the airplane flight that will influence the noise floor (e.g., in an aircraft cockpit). For example, if the windshield vipers are activated during flight, they will produce much noise which has to be accounted for in the FCA. Also, stormy weather raises the level of the noise floor for several decibels.

To obtain high reliability and robustness in noise floor estimation, two estimators are used: the first one which follows the noise floor level slowly, and the second one which follows the noise floor quickly. The slow estimator rises slowly, but decays quickly, for better environmental noise estimation. The fast estimator rises and falls quickly, for it is designed to detect transient energy changes in the input audio signal. Both estimators work in conjunction to produce the best value for the feedback detection threshold.

Spectral Analysis

Fast Fourier Transform

3rd Millisecond

Spectral analysis begins with the mathematical operation of Fast Fourier Transform (FFT) being performed on 128 samples. The results of FFT operation are stored in magnitude and phase arrays. The result of this function provides normalized power spectrum of the audio input.

The magnitude array contains two mirror images of the frequency response, so it is necessary to discard half of the array, and use first 64 bin samples for frequencies up to 16000 Hz. The FCA uses first 24 frequency response bins because the digital audio of system 400 is band limited from 300-6000 Hz. FIG. 12 shows the first 24 bins of the frequency transform, their frequency ranges, and corresponding bandpass filter numbers.

The modified critical-band scale follows logarithmic spacing and is tuned manually for the ACP digital audio. At high frequencies, one filter covers a large range, while at low frequencies, each filter covers a small range. Approximate frequency values of each filter and their corresponding frequency bin are shown in FIG. 12.

History Buffer Insertion

4th Millisecond

The main purpose of the history buffer is to provide knowledge about audio waveform right before the acoustic feedback event in time. The FCA continuously fills this multi-dimensional array by using a first-in, first-out (FIFO) operation. The history buffer is filled with frequency response array. The history array is used for the feedback occurrence search once the feedback detection threshold is reached.

Increment Overload Counter

4th Millisecond

This counter is used to measure number of adjacent frames with levels of gain across frequency bands exceeding the permissible level. If during the processing of ten concurrent frames the average energy stays above permissible level, overload gain protection will activate and attenuate bandpass filters.

The overload gain protection (OGP) is engaged if feedback energy across frequency bands measured in dB exceeds permissible level for more than 40 ms of live audio input. Overload can happen if the gain in the system exceeds unity gain, driven by microphone pre-amplifiers and speaker power-amplifiers.

The point of saturation for ACP system is set to 6 dB under noise ceiling. The OGP operates on the response over frame of 1280 samples, which is 32 ms. By adjusting overall gain of the audio signal, feedback is suppressed, with the side effect of softer total volume in the speakers in the feedback audio path. The headphones are not affected by this operation. Once engaged, the OGP stays active for three seconds, and then disengages, restoring the original gain in the speakers. This transition is performed in a smooth manner by using 1st order low-pass filtering operation.

The amount of the OGP total volume attenuation is determined by the position of the knobs, and it varies between 6-20 dB. For obvious reasons, it is important to have enough attenuation for decay of the feedback, otherwise the system will go into an unstable resonant mode.

Enhanced feedback detector can separate “speech” from “acoustic feedback” because of the time distribution impulse character of speech syllables versus the continuous exponential nature of acoustic feedback.

Figures 13, 14:
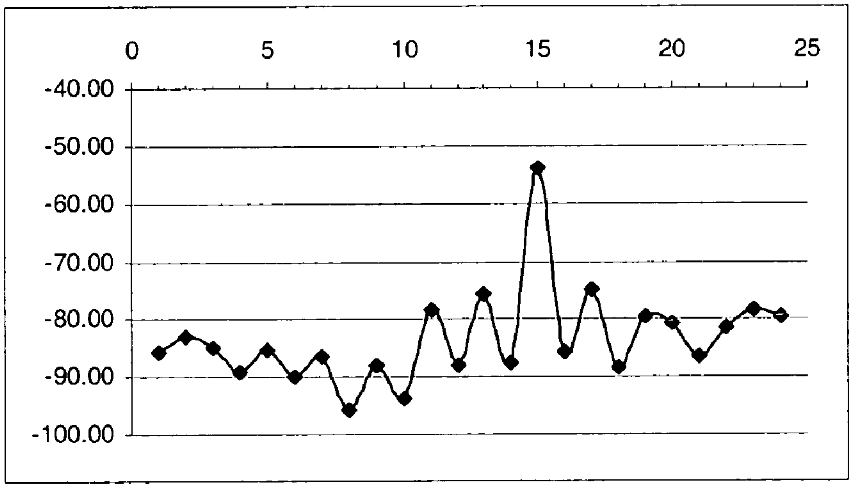
FIG. 13 shows maximum peak search and frequency bin selection.
FIG. 14 shows the first analyzed frame used for maximum peak search.

The maximum peak detection is performed using a sliding comparison method, starting from the lowest frequency bin, as shown in the top left part of the FIG. 13. The first frame in the history buffer is treated as a one-dimensional spectrum arrays and used for a global maximum peak search. The correct estimation of the global peak is assured by simultaneous usage of three search pointers (Prev, Next, Curr), using a top-down searching method. The points of local maximums are discarded from the decision because the objective is to find global maximum peak of the response function.

Once the global maximum peak is found (bin 15 in the FIG. 12), all the sample values of the history buffer for the selected bin are stored into new Peaks array, used for Slopeness and Peakness calculations.

Maximum peak search is performed on the first frame of the history buffer. In this case, the location of the maximum peak is obvious (bin 15).

Figure 15:
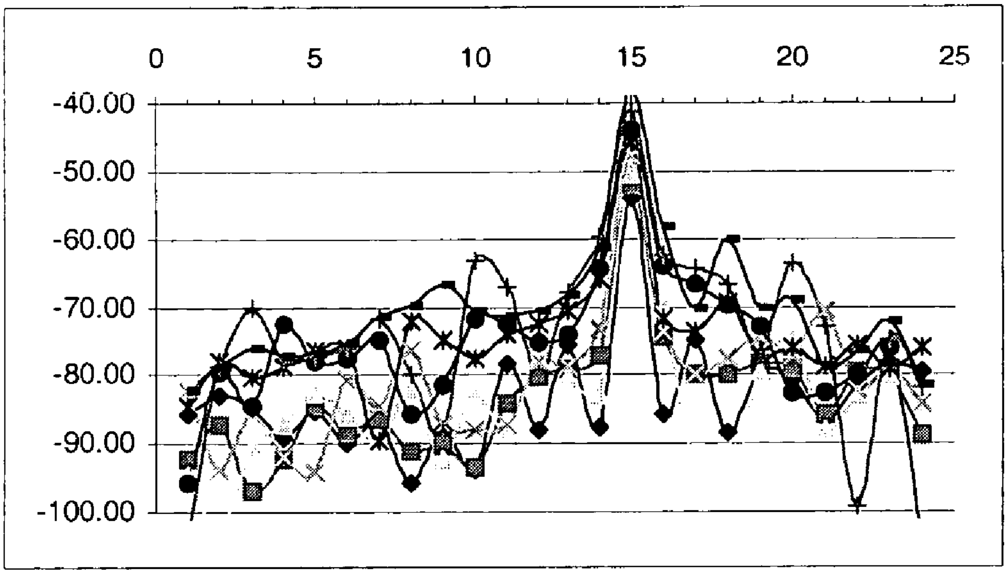
FIG. 15 shows a complete dataset of current history buffer.

After the peak amplitude frequency has been found, the history audio buffer array is analyzed, and gain information for specified frequency bin is extracted. The complete dataset of the history buffer (8 frames) is shown in FIG. 15.

Figures 16, 17:
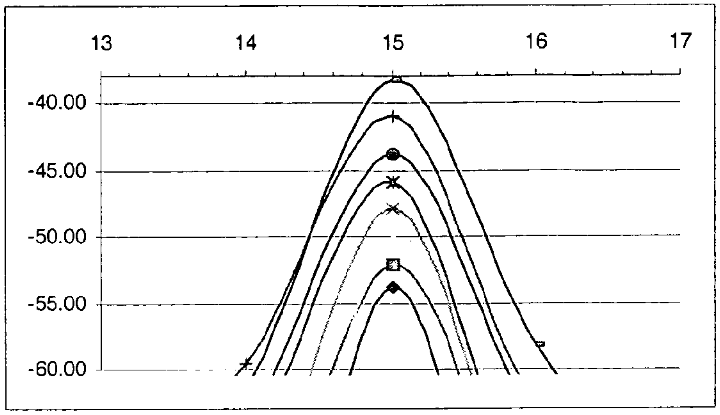
FIG. 16 shows the data points used for feedback detection.
FIG. 17 shows the calculation of deviance for a Peaks array for the example feedback file.

The location of the peak is particularly important because it contains the information about feedback existence. Zoomed plot in FIG. 16 shows peak behavior over time. These sample points are stored into Peaks array, used for Slopeness calculations.

The first step in slope analysis is find deviance of the subsequent slope values. The global average used for deviation is the slope between the first and last element. Then, each deviation is subtracted from global, and average of all deviations is found. The FIG. 17 shows the operation of deviance calculation for the example feedback file.

This particular example is a representative of “conforming” feedback with small deviation in slope variation. Indeed, when the data points are plotted, a straight line appears. This is shown in FIG. 18 by a visual plot of the dataset presented above.

High deviation between slopes means that the unknown signal is not acoustic feedback. The dataset presented above is used in FIG. 21 to plot the variability of slope exhibited by a non-feedback audio signal.

After the global deviance is found, it is used with percentage lookup to determine final value of the Slopeness, for the current history buffer array. High deviation means that the signal is not acoustic feedback.

To exactly determine how peaky the signal is in the frequency domain, several steps are performed on the history buffer array. In FIG. 20, the left attenuation represent average dB level difference between peak and six bins on its left side (lower frequency). Similar setup is used to calculate the right attenuation amount. After the global deviance is found, it is used with percentage lookup to determine final value of the Slopeness, for the current history buffer array. High deviation means that the signal is not acoustic feedback.

To exactly determine how peaky the signal is in the frequency domain, several steps are performed on the history buffer array. In FIG. 21, the left attenuation represent average dB level difference between peak and six bins on its left side (lower frequency). Similar setup is used to calculate the right attenuation amount.

To correctly estimate the Peakness for unknown audio signal, average attenuation on the both sides is calculated. Starting at zero, Peakness gets incremented by 0.0625 every time the attenuation is greater than 15 dB. The final value has to be in the range 0-1, with 1 being 100% Peakness (peaky signal).

Both Slopeness and Peakness are used to obtain FEP calculation for the current block of audio. Because of varying importance in probability calculation, two features are weighted using different factors. Using trial-and-error method, Slopeness exhibited higher statistical importance than Peakness for correct feedback detection. The basic formula for FEP calculation that produces percentage probability of signal being feedback is shown below.

*FEP*=0.7*Slopeness+0.3*Peakness;

At this stage, the FCA activates digital filters to suppress feedback frequency, if there is one. The filter frequency is determined by the following calculation:

filter_frequency=Peak_Frequency_Bin*(16000/64);

Now, the appropriate filters are activated which will attenuate specified frequency and actively remove feedback. The adjacent filters are adjusted to perform smooth equalization operation and to help in feedback reduction.

FIG. 22 shows a possible operating sequence for a feedback control system and method according to an embodiment of the invention.

Therefore, while there has been described what is presently considered to be the preferred embodiment, it will understood by those skilled in the art that other modifications can be made within the spirit of the invention.

We claim:

1. A method for canceling acoustic feedback in an electronic circuit providing a digital audio signal, the method comprising steps of:

producing a digital audio signal at an output of the electronic circuit;

preparing the digital audio signal for analysis to detect a feedback signal by transforming the digital audio signal into a frequency domain using a Fast Fourier Transform (FFT) performed on a plurality of buffer sample frames;

storing results of the FFT in magnitude and phase arrays in a history buffer;

detecting a feedback signal in the digital audio signal by determining a peakness and slopeness of the digital audio signal;

detecting a zone of hardly noticeable feedback which represents the zone in a time domain where sound produced by an acoustic feedback is still so quiet that it cannot be heard at all by human listeners;

determining a frequency of the feedback signal; and selecting a bandpass filter from among a bank of bandpass filters wherein the selected bandpass filter comprises a response characteristic that attenuates parts of the feedback signal at the frequency of the feedback signal;

using the history buffer to store frames of the digital audio signal and calculating a feedback existence probability of the audio signal;

wherein the step of preparing the digital audio signal for analysis to detect the feedback signal comprises representing the digital audio signal in a logarithmic domain;

wherein the step of determining the frequency of the feedback signal comprises determining the slopeness of the feedback signal at a plurality of points of the logarithmic graph, and wherein determining the slopeness comprises storing at least a part of the digital audio signal in the history buffer, determining a slope at each of the plurality of points of the logarithmic graph and comparing a plurality of slopes in history buffer data, and determining that the feedback signal is present when a substantial deviation from other slopes is detected at a one of the plurality of points; and coupling the bandpass filter selected to an output of the electronic circuit to filter out an acoustic feedback, wherein when a part of the digital audio signal has an amplitude substantially higher than other parts of the digital audio signal, the method comprises recording the frequency of the part of the digital audio signal as a peak to analyze the part of the digital audio signal in the spectral domain over time.

2. The method of claim 1 wherein the step of determining the frequency of the feedback signal further comprises finding a part of the digital audio signal where the slope is substantially constant.

3. The method of claim 1 wherein the peakness is determined by:

converting the digital audio signal to the frequency domain;

finding a part of the signal where a peak in amplitude is located; and storing, as a global variable, information about the part of the signal where the-peak in amplitude is located;

wherein the step of preparing the digital audio signal for analysis to detect the feedback signal comprises transforming the digital audio signal into the frequency domain; and wherein the step of detecting the feedback signal comprises determining the peakness of the digital audio signal.

4. The method of claim 1 further comprising implementing an overload counter having an overload counter wherein the counter comprises a value that is incremented when the counter value exceeds a threshold.

5. The method of claim 1 wherein the step of detecting the feedback signal comprises determining a feedback existence probability.

6. The method of claim 1 further comprising:

determining a filter frequency for the selected filter, and attenuating bandpass gain for the filter at the filter frequency.

7. The method of claim 1 further comprising calculating a detection threshold prior to the step of detecting the feedback signal.

8. The method of claim 1 wherein the plurality of samples includes 32 milliseconds of the digital audio signal last played.

9. The method of claim 1 wherein the input signal comprises conforming acoustic feedback comprising a straight consistent slope in the logarithmic domain for a plurality of data points.

10. A system for canceling acoustic feedback in a digital audio signal, the system comprising:

a global spectral envelope analyzer comprising a processor configured to detect a feedback signal in the digital audio signal and to determine the frequency of the feedback signal; and a bandpass filter bank comprising a plurality of bandpass filters for attenuating the feedback signal;

wherein the processor is further configured to:

select a bandpass filter from among the plurality of bandpass filters;

preparing the digital audio signal for analysis to detect the feedback signal by transforming the digital audio signal into the frequency domain; and detecting the feedback signal in the digital audio signal by determining a peakness and a slopeness of the digital audio signal; and wherein the selected bandpass filter comprises a response characteristic that attenuates parts of the signal at the frequency of the feedback signal;

wherein preparing the digital audio signal for analysis to detect the feedback signal comprises representing the digital audio signal in a logarithmic domain; and wherein the step of determining the frequency of the feedback signal comprises determining the slopeness of the signal at a plurality of points of the logarithmic graph.

11. The system of claim 10 wherein the feedback analyzer comprises a history buffer used to provide data about an audio waveform immediately preceding an acoustic feedback event in time, which enables the global spectral envelope analyzer to go back in time and determine a presence of acoustic feedback in the input signal.

12. The system of claim 10 wherein the input signal comprises conforming acoustic feedback comprising a straight consistent slope in the logarithmic domain for a plurality of data points.

13. The system of claim 10 wherein the bandpass filter bank comprises fourteen bandpass filters, each bandpass filter having an adjustable gain controlled by the feedback analyzer.

14. The system of claim 13 further comprising a digital audio buffer comprising eight partitions, each partition for storing a frame of samples of the digital input signal.

* * * * *